DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 12

T947,002
POLYVINYL CHLORIDE COMPOSITIONS
Don Rhea, Rte. 15, 421 Old Castle Road, Kingsport, Tenn. 37660
Continuation of abandoned application Ser. No. 446,872, Feb. 28, 1974. This application May 16, 1975, Ser. No. 578,234
Int. Cl. C08k *5/12*
U.S. Cl. 260—31.8 R
No Drawing. 9 Pages Specification

Iron oxide ($Fe_2O_3$) and potassium fluoride, when mixed together in approximately equal amounts and incorporated into plasticized polyvinyl chloride in small quantities, have a synergistic effect in reducing smoke from the polymer during burning.